United States Patent
Abe et al.

(10) Patent No.: US 10,022,797 B2
(45) Date of Patent: Jul. 17, 2018

(54) METHOD FOR MANUFACTURING THREE-DIMENSIONAL SHAPED OBJECT AND THREE-DIMENSIONAL SHAPED OBJECT

(75) Inventors: Satoshi Abe, Osaka (JP); Norio Yoshida, Nara (JP); Isao Fuwa, Osaka (JP); Yoshikazu Higashi, Shiga (JP); Masataka Takenami, Osaka (JP); Isamu Matumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1133 days.

(21) Appl. No.: 13/578,007

(22) PCT Filed: Feb. 16, 2011

(86) PCT No.: PCT/JP2011/053276
§ 371 (c)(1),
(2), (4) Date: Aug. 9, 2012

(87) PCT Pub. No.: WO2011/102382
PCT Pub. Date: Aug. 25, 2011

(65) Prior Publication Data
US 2012/0308781 A1 Dec. 6, 2012

(30) Foreign Application Priority Data
Feb. 17, 2010 (JP) .................................. 2010-032684

(51) Int. Cl.
B23K 26/00 (2014.01)
B22F 3/16 (2006.01)
(Continued)

(52) U.S. Cl.
CPC .............. *B22F 3/162* (2013.01); *B22F 3/105* (2013.01); *B33Y 10/00* (2014.12); *B23P 15/24* (2013.01); *Y10T 428/24752* (2015.01)

(58) Field of Classification Search
CPC .......... B22F 3/105; B22F 3/162; B23P 15/24; Y10T 428/24752; B33Y 10/00; B23K 26/00
(Continued)

(56) References Cited

U.S. PATENT DOCUMENTS 4,863,538 A 9/1989 Deckard
4,938,816 A 7/1990 Beaman et al.
(Continued)

FOREIGN PATENT DOCUMENTS

CN 1753747 3/2006
CN 101511509 8/2009
(Continued)

OTHER PUBLICATIONS

German to English machine translation of DE 102009036648.*
(Continued)

*Primary Examiner* — Michael G Hoang
(74) *Attorney, Agent, or Firm* — Greenblum & Bernstein, P.L.C.

(57) ABSTRACT

A method for manufacturing a three-dimensional shaped object wherein the warping of the base plate is suitably addressed. The method of the present invention comprises: (i) forming a solidified layer by irradiating a predetermined portion of a powder layer on a base plate with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new
(Continued)

powder layer with the light beam, the steps (i) and (ii) being repeatedly performed; wherein, prior to or upon the manufacturing of the three-dimensional shaped object, the base plate is subjected to a heat treatment, thereby causing the base plate to be warped, and at least a lower surface of the warped base plate is subjected to a flattening process.

6 Claims, 14 Drawing Sheets

(51) Int. Cl.
  *B33Y 10/00* (2015.01)
  *B22F 3/105* (2006.01)
  *B23P 15/24* (2006.01)

(58) Field of Classification Search
  USPC .................................... 219/121.85; 428/189
  See application file for complete search history.

(56) References Cited

U.S. PATENT DOCUMENTS

| | | | |
|---|---|---|---|
| 4,944,817 A | | 7/1990 | Bourell et al. |
| 5,017,753 A | | 5/1991 | Deckard |
| 5,053,090 A | | 10/1991 | Beaman et al. |
| 5,076,869 A | | 12/1991 | Bourell et al. |
| 5,132,143 A | | 7/1992 | Deckard |
| 5,147,587 A | | 9/1992 | Marcus et al. |
| 5,155,324 A | | 10/1992 | Deckard et al. |
| 5,156,697 A | | 10/1992 | Bourell et al. |
| 5,182,170 A | | 1/1993 | Marcus et al. |
| 5,284,695 A | | 2/1994 | Barlow et al. |
| 5,296,062 A | | 3/1994 | Bourell et al. |
| 5,316,580 A | | 5/1994 | Deckard |
| 5,382,308 A | | 1/1995 | Bourell et al. |
| 5,431,967 A | | 7/1995 | Manthiram et al. |
| 5,597,589 A | | 1/1997 | Deckard |
| 5,616,294 A | | 4/1997 | Deckard |
| 5,639,070 A | | 6/1997 | Deckard |
| 6,163,961 A | * | 12/2000 | McMeekin ............ F16C 33/14 29/898.056 |
| 6,391,251 B1 | | 5/2002 | Keicher et al. |
| 6,501,997 B1 | * | 12/2002 | Kakino ............ G05B 19/40937 318/568.1 |
| 6,657,155 B2 | | 12/2003 | Abe et al. |
| 7,255,830 B2 | | 8/2007 | Abe et al. |
| 7,323,132 B2 | | 1/2008 | Abe et al. |
| 7,754,135 B2 | | 7/2010 | Abe et al. |
| 7,867,431 B2 | | 1/2011 | Higashi et al. |
| 8,062,020 B2 | | 11/2011 | Abe et al. |
| 8,163,224 B2 | | 4/2012 | Higashi et al. |
| 2004/0021256 A1 | | 2/2004 | DeGrange et al. |
| 2004/0056022 A1 | | 3/2004 | Meiners et al. |
| 2006/0208396 A1 | | 9/2006 | Abe et al. |
| 2007/0023977 A1 | | 2/2007 | Braun et al. |
| 2010/0034983 A1 | * | 2/2010 | Fuwa .................... B22F 3/1055 427/557 |
| 2011/0123383 A1 | | 5/2011 | Fuwa et al. |
| 2012/0041586 A1 | | 2/2012 | Abe et al. |
| 2012/0093674 A1 | | 4/2012 | Abe et al. |
| 2012/0126457 A1 | | 5/2012 | Abe et al. |
| 2012/0139166 A1 | | 6/2012 | Abe et al. |
| 2012/0251378 A1 | | 10/2012 | Abe et al. |

FOREIGN PATENT DOCUMENTS

| | | | |
|---|---|---|---|
| DE | 102009036648 A1 * | 2/2010 | ............ B22F 3/1055 |
| JP | 1-502890 | 10/1989 | |
| JP | 06-155587 | 6/1994 | |
| JP | 2000-073108 | 3/2000 | |
| JP | 2006-124732 | 5/2006 | |
| JP | 2007-077443 | 3/2007 | |
| JP | 2007-270227 | 10/2007 | |
| JP | 2008-101256 | 5/2008 | |
| JP | 2008-291315 | 12/2008 | |
| JP | 2010-042524 | 2/2010 | |
| WO | 88/02677 | 4/1988 | |

OTHER PUBLICATIONS

German to English machine translation of DE 102009036648 A1.*
China Office action, dated Feb. 8, 2014 along with an english translation thereof.
Office Action issued in Germany Counterpart Patent Appl. No. 112011100572.5, dated Feb. 8, 2018, along with an English translation thereof.
Office Action issued in India Counterpart Patent Appl. No. 7933/CHENP/2012, dated Mar. 13, 2018.

* cited by examiner (a)
- PRIOR ART -

Flat machining of lower surface (b)

Flat machining of upper surface

Flat machining of lower surface (c)

Flat machining of side surface          Flat machining of side surface

Flat machining of lower surface (d)

Flat machining of upper surface

Flat machining of side surface          Flat machining of side surface

Flat machining of lower surface (a)

(b)

(c)

(d)

Laser irradiation

METHOD FOR MANUFACTURING THREE-DIMENSIONAL SHAPED OBJECT AND THREE-DIMENSIONAL SHAPED OBJECT

TECHNICAL FIELD

The present invention relates to a method for manufacturing a three-dimensional shaped object, and also relates to the three-dimensional shaped object obtained thereby. More particularly, the present invention relates to a method for manufacturing a three-dimensional shaped object with a plurality of solidified layers stacked integrally by repeating the step of forming a solidified layer by irradiating a predetermined portion of a powder layer with a light beam, and also relates to the three-dimensional shaped object obtained by such manufacturing method.

BACKGROUND OF THE INVENTION

Heretofore, a method for manufacturing a three-dimensional shaped object by irradiating a powder with a light beam has been known (such method can be generally referred to as "selective laser sintering method"). Such method can produce a three-dimensional shaped object with a plurality of solidified layers stacked integrally by repeating the step (i) of forming a solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated contour shape in a short period of time.

In most cases regarding the selective laser sintering method, the manufacturing of the three-dimensional shaped object is performed under an inert atmosphere in a chamber to prevent an oxidation of the shaped object. Within the chamber, a base plate is disposed on a forming table, and the base plate is secured to the table by means of a bolt. Thereafter, the three-dimensional shaped object is manufactured on the bolted base plate. By way of the case of using a metal powder as a powder material and using the resulting three-dimensional shaped object as metal mold, as shown in FIG. 1, a powder layer 22 with a predetermined thickness "t1" is firstly formed on the base plate 21 (see FIG. 1(a)) and then a predetermined portion of a powder layer 22 is irradiated with a light beam to form a solidified layer 24 on the base plate 21. Then, a powder layer 22 is newly provided on the solidified layer 24 thus formed and is irradiated again with the light beam to form another solidified layer. In this way, the solidified layer is repeatedly formed, which leads to a provision of a three-dimensional shaped object with a plurality of solidified layers 24 stacked integrally (see FIG. 1(b)). The solidified layer corresponding to a bottom layer can be formed in a state of being adhered to the surface of the base plate. Therefore, the three-dimensional shaped object and the base plate are mutually integrated. The integrated "three-dimensional shaped object" and "base plate" can be used as a metal mold as they are.

PATENT DOCUMENTS (PRIOR ART PATENT DOCUMENTS)

PATENT DOCUMENT 1: JP-T-01-502890
PATENT DOCUMENT 2: JP-A-2000-73108

DISCLOSURE OF THE INVENTION

Problems to be Solved by the Invention

Due to the fact that the three-dimensional shaped object is manufactured by irradiation of the light beam, not only the three-dimensional shaped object but also the base plate serving as supporting it is more or less affected by a heat of the light beam. Specifically, the irradiated portion of the powder layer is once melted and subsequently the molten powder is solidified to form the solidified layer. In such formation of the solidified layer, a shrinkage phenomenon can occur (see FIG. 2(a)). While not wishing to be bound by any theory, the shrinkage phenomenon can cause a generation of a stress upon the solidifying of the molten powder by allowing it to be cooled. On the other hand, the base plate, which is to be integrated with the solidified layer (i.e., three-dimensional shaped object), is a rigid body made of, for example, a steel material. Therefore, the base plate cannot sufficiently shrink upon the formation of the solidified layer since the base plate is the rigid body, and also is secured to the table. As a result, the stress can remain in the base plate after the formation of the solidified layer. Consequently, when the securing of the base plate is released by removing the bolt, a warping of the base plate and thus a warping of the shaped object are caused due to the residual stress.

The present invention has been created in order to address the above problem. That is, an object of the present invention is to provide a "method for manufacturing a three-dimensional shaped object" wherein the warping of the base plate is suitably coped with.

Means for Solving the Problems

In order to achieve the above object, the present invention provides a method for manufacturing a three-dimensional shaped object, comprising the steps of:
(i) forming a solidified layer by irradiating a predetermined portion of a powder layer on a base plate with a light beam, thereby allowing a sintering of the powder of the predetermined portion or a melting and subsequent solidification thereof; and
(ii) forming another solidified layer by newly forming a powder layer on the resulting solidified layer, and then irradiating another predetermined portion of the new powder layer with the light beam, the steps (i) and (ii) being repeatedly performed;
wherein, prior to or upon the manufacturing of the three-dimensional shaped object, (a) the base plate is subjected to a heat treatment, thereby causing the base plate to be warped, and (b) at least a lower surface of the warped base plate is subjected to a flattening process.

One of features of the manufacturing method according to the present invention is that a "plate in which a deformed portion thereof due to a heat treatment has been subjected to a flattening process" is used as the base plate for the shaped object. In other words, the present invention is characterized in that the "base plate with a residual stress attributed to the heat treatment remaining therein" is positively used in spite of such residual stress.

The meaning of the term "heat treatment" as used in the present description and claims includes not only a direct heat treatment wherein the base plate is directly heated, but also an indirect heat treatment wherein the base plate is indirectly heated (for example, a powder layer formed on the base plate is heated). As for the former case (i.e., "direct" heat treatment), a warp deformation of the base plate is caused largely by "thermal stress". While on the other hand, as for the latter case (i.e., "indirect" heat treatment), the warp deformation of the base plate is caused not only by "thermal stress", but also by "tensile stress generated upon the formation of the solidified layer" or the like. The term "base plate" as used in the present description and claims substantially means a member which serves as a platform for the three-dimensional shaped object to be manufactured. In a preferred embodiment, the term "base plate" means a plate-like member disposed on a forming table. In this regard, the term "lower surface" of the base plate, which is also used in the present description and claims, substantially means a surface opposed to an "upper surface", provided that a surface in contact with the shaped object is the "upper surface".

The term "warp" or "warping" as used in the present description and claims substantially means a "deformation of the base plate" which can be attributed to a heat treatment of the base plate. Therefore, the meaning of the term "warp" or "warping" includes not only a typical deformation wherein an outer edge of the base plate transforms largely as illustrated in FIG. 2(b), but also various other transformations especially in terms of the shape of the base plate.

The term "flattening process" as used in the present description and claims substantially means that a machining process of the base plate wherein a surface portion thereof is partially removed to provide a flat surface.

Describing just for confirmation, the term "powder layer" as used in this description and claims means "metal powder layer made of a metal powder" or "resin powder layer made of a resin powder", for example. Also, the term "predetermined portion of a powder layer" substantially means a portion of a three-dimensional shaped object to be manufactured. Therefore, a powder existing in such predetermined portion is irradiated with a light beam, whereby, the powder undergoes a sintering or a melting and subsequent solidification thereof to form a shape of the three-dimensional shaped object. Furthermore, the term "solidified layer" substantially means "sintered layer" in a case where the powder layer is a metal powder layer, whereas it substantially means "cured layer" in a case where the powder layer is a resin powder layer.

In the manufacturing method of the present invention, an irradiation source for the light beam of the steps (i) and (ii) is used as a heat source for the warp deformation of the base plate. Alternatively, any other suitable heat sources, which are different from the irradiation source of the selective laser sintering, may also be used. In this regard, an arc discharge source or a thermal spray source may be used, for example.

In one preferred embodiment, one or more layers of the powder layer and/or solidified layer formed on the base plate is subjected to the heat treatment to cause the warping of the base plate. This means that the warping of the base plate may be caused during the manufacturing of the three-dimensional shaped object.

In another preferred embodiment, the base plate is subjected to the heat treatment such that the upper surface of the base plate (especially, the whole upper surface of the base plate) is heated. This can cause a possible residual stress to occur as much as possible in advance in the base plate. As a result, the further warp deformation of the base plate, which may occur in subsequent formation of the solidified layer, can be suitably prevented. The heating area of the base plate may be limited according to the three-dimensional shaped object to be manufactured. For example, "heating area of the base plate" or "heating area of one or more layers of the powder layer and/or solidified layer formed on the base plate" may be determined in accordance with the weight, volume, position and/or "contact shape and/or contact area between the three-dimensional shaped object and the base plate". In this case, the heat treatment is performed with respect to such limited area of the base plate or the layer.

In still another preferred embodiment, the flattening process is performed after the formation of 50 to 100 layers of the solidified layers (in some cases, 10 to 200 layers of the solidified layers) on the base plate is completed. This makes it possible to inhibit the too large warp deformation after the flattening process.

The present invention also provides a three-dimensional shaped object obtained by the aforementioned manufacturing method. In particularly preferred embodiment, a bottom surface of such three-dimensional shaped object is provided with a base plate wherein the bottom surface of the shaped object and the base plate are jointed with each other, and a lower surface of the base plate is a flattened surface.

Effect of the Invention

The manufacturing method of the present invention utilizes the base plate which has been subjected to the flattening process after causing it to be warped (particularly, it utilizes the base plate obtained by flattening the warped portion thereof attributed to a thermal stress or a tensile stress). This utilization of the warped and subsequent flattened base plate makes it possible to reduce an accumulation of the further stress after a point in time of the flattering during the manufacturing process of the shaped object. In other words, in accordance with the present invention, the possible stress which may occur upon the manufacturing of the three-dimensional shaped object is caused in advance in the base plate, and the resulting deformation of the base plate due to such stress is removed in advance, and thereby a suppression of the further warping of the base plate after that can be effectively achieved.

The suppression of the warping of the base plate can enhance a shape accuracy of the three-dimensional shaped object. In this regard, it was inevitably required in the prior art to design on preliminary assumption of the extent of the warping in order to achieve the shape accuracy of the three-dimensional shaped object. However, it is possible according to the present invention to achieve the shape accuracy only in advance by subjecting the base plate for supporting the shaped object to the heat treatment and the subsequent flattening process. In other words, the present invention is very useful in that it can eliminate the difficulty of such unpredictable "extent of the warping of the plate" by introducing the simple steps (i.e., by introducing the heating and flattening steps) to the manufacturing of the shaped object.

EXPLANATION OF REFERENCE NUMERALS

Figure 1:
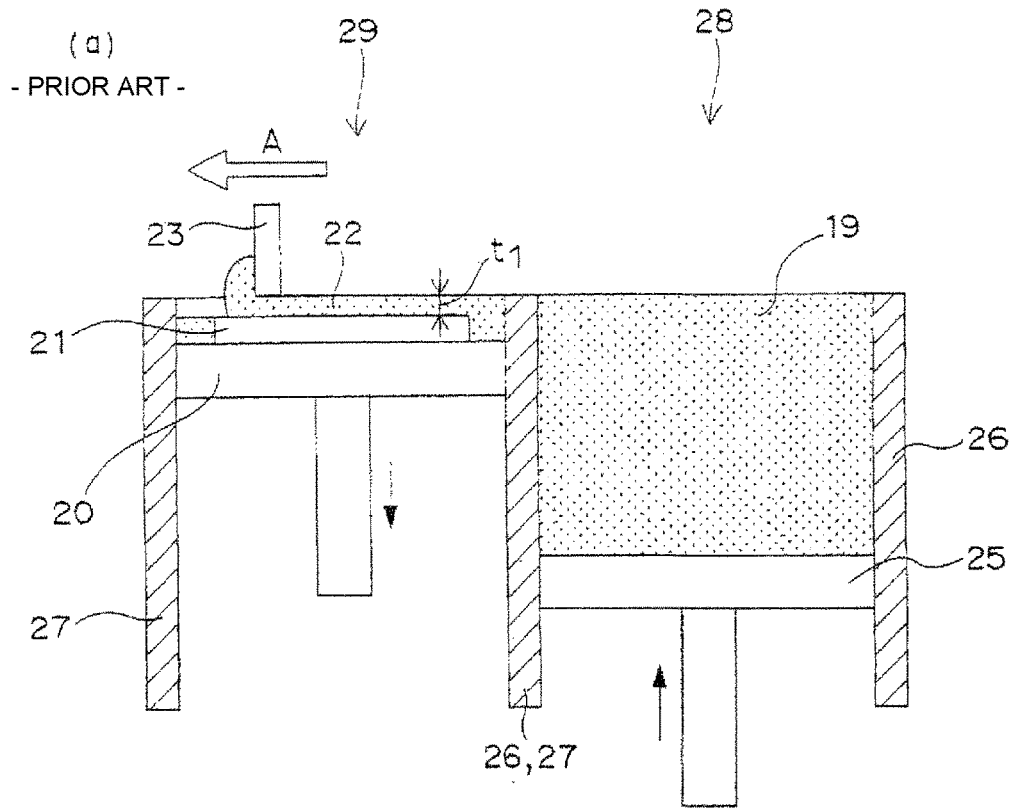
FIGS. 1(a) and 1(b) are sectional views schematically showing operations of a laser-sintering/machining hybrid machine.
Figure 1:
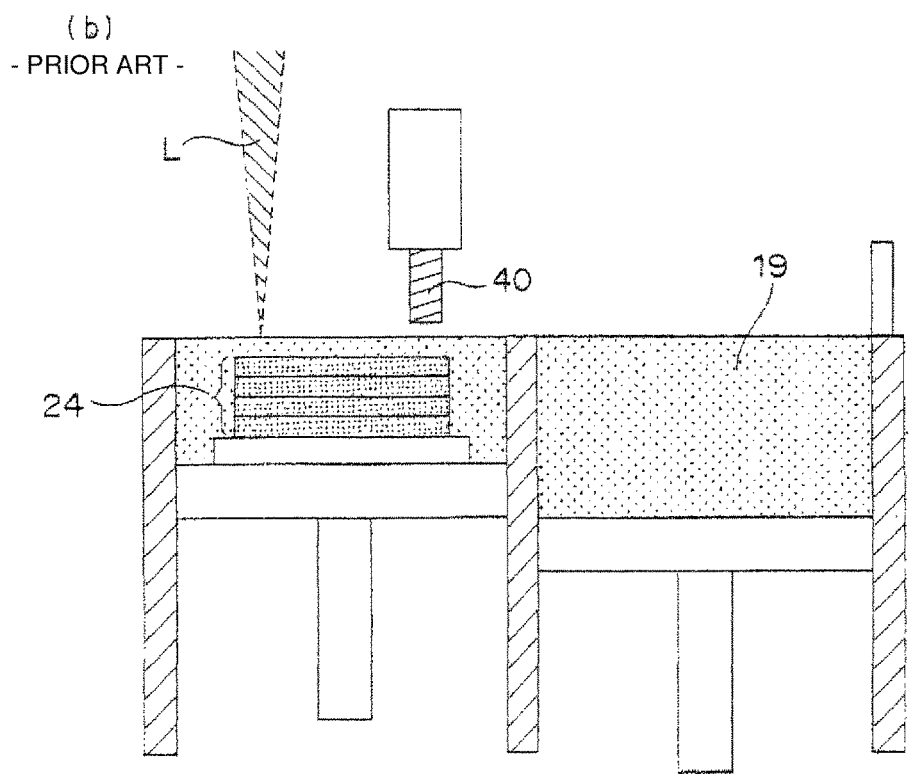
Figure 2:
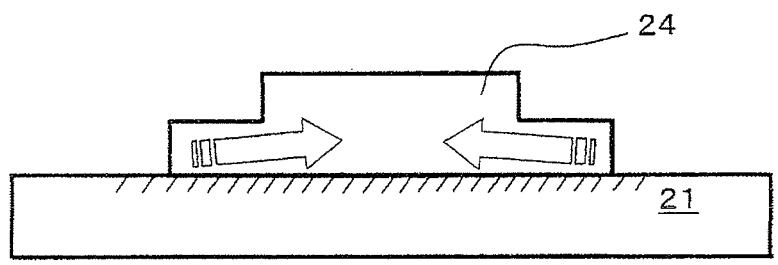
FIGS. 2(a) and 2(b) are sectional views schematically illustrating a warp deformation of a base plate for the shaped object.
Figure 2:
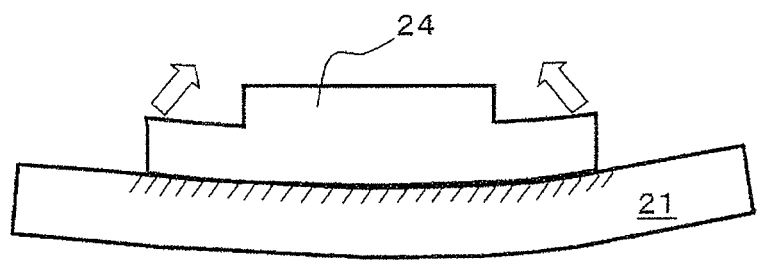

1 Laser-sintering/machining hybrid machine
2 Powder layer forming means
3 Light-beam irradiation means
4 Machining means
19 Powder/powder layer (e.g., metal powder/metal powder layer or resin powder/resin powder layer)
20 Forming table
21 Base plate (base plate for shaped object)
22 Powder layer (e.g., metal powder layer or resin powder layer)
23 Squeegee blade
24 Solidified layer (e.g., sintered layer or cured layer) or three-dimensional shaped object obtained therefrom
24' Area of bottom surface of three-dimensional shaped object
25 Powder table
26 Wall of storage tank for powder material
27 Wall of forming tank
28 Storage tank for powder material
29 Forming tank
30 Light beam generator
31 Galvanometer mirror
32 Reflecting mirror
33 Collecting lens
40 Milling head
41 X-Y actuator
41a X-axis actuator
41b Y-axis actuator
42 Tool magazine
50 Chamber
52 Window for transmission of light
L Light beam

BEST MODES FOR CARRYING OUT THE INVENTION

The present invention will be hereinafter described in more detail with reference to the accompanying drawings.
[Selective Laser Sintering Method]

Figure 3:
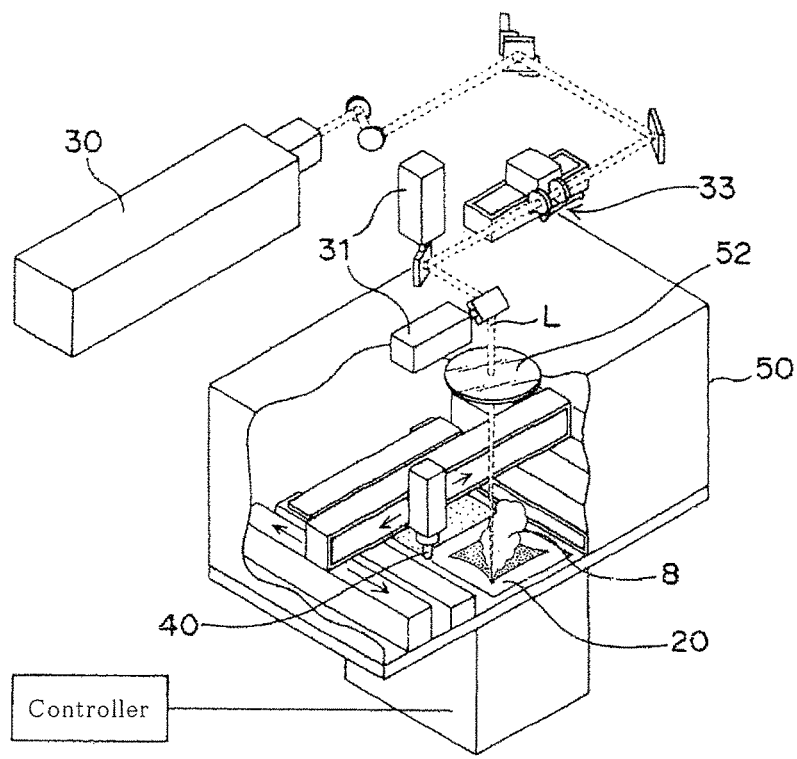
FIGS. 3(a) and 3(b) are perspective views schematically illustrating a device for performing a laser sintering (i.e., selective laser sintering method) wherein FIG. 3(a) especially shows a hybrid device with a machining mechanism, and FIG. 3 (b) especially shows a device without a machining mechanism.
Figure 3:
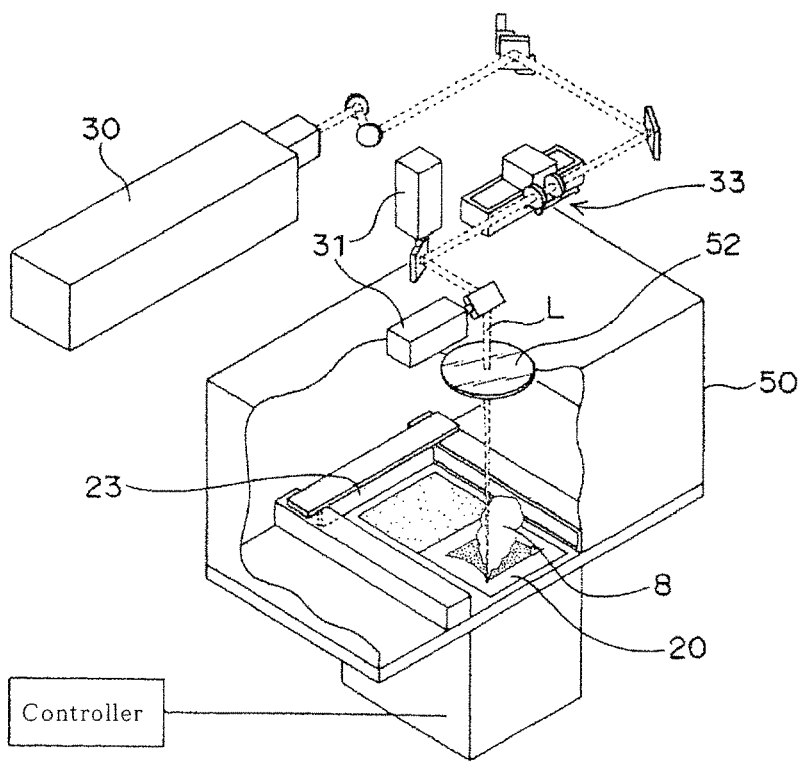
Figure 4:
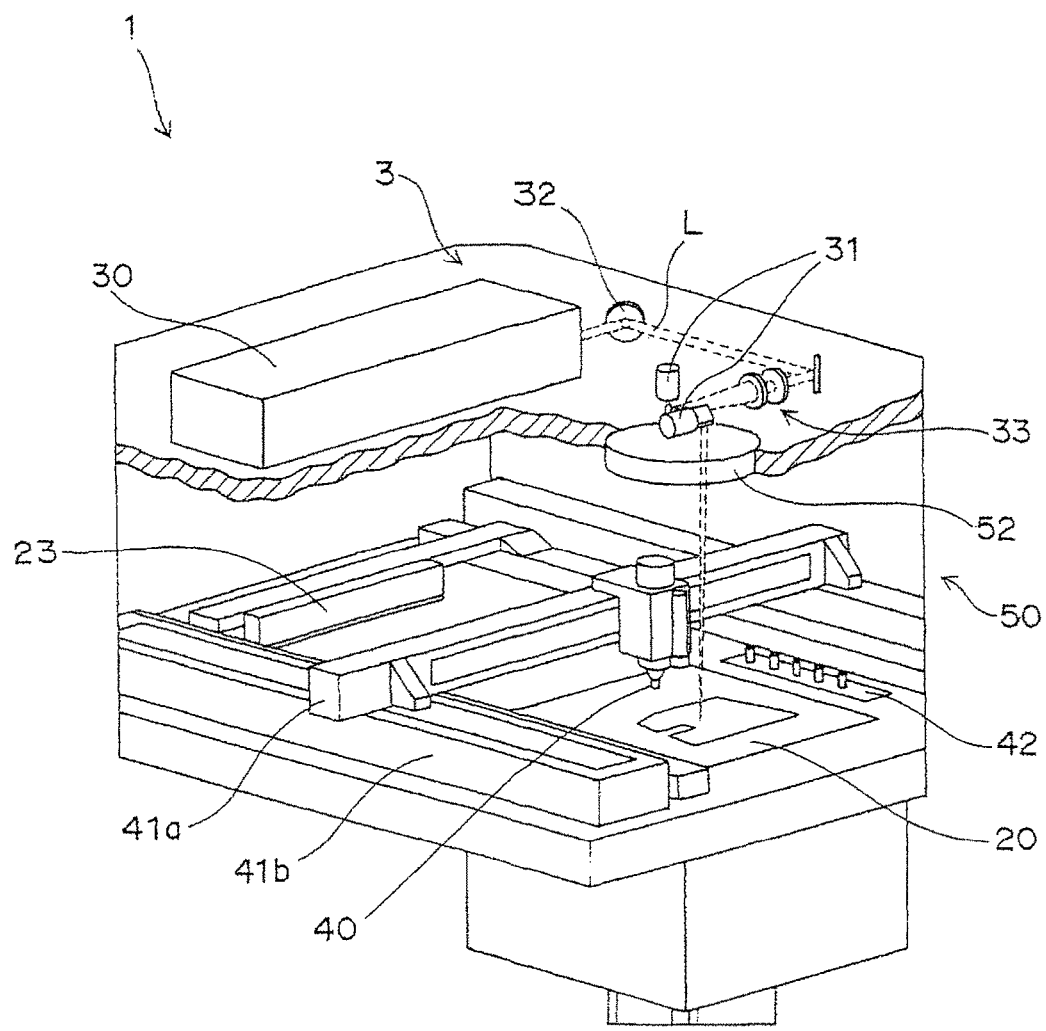
FIG. 4 is a perspective view schematically showing an embodiment in which a selective laser sintering method is carried out.
Figure 5:
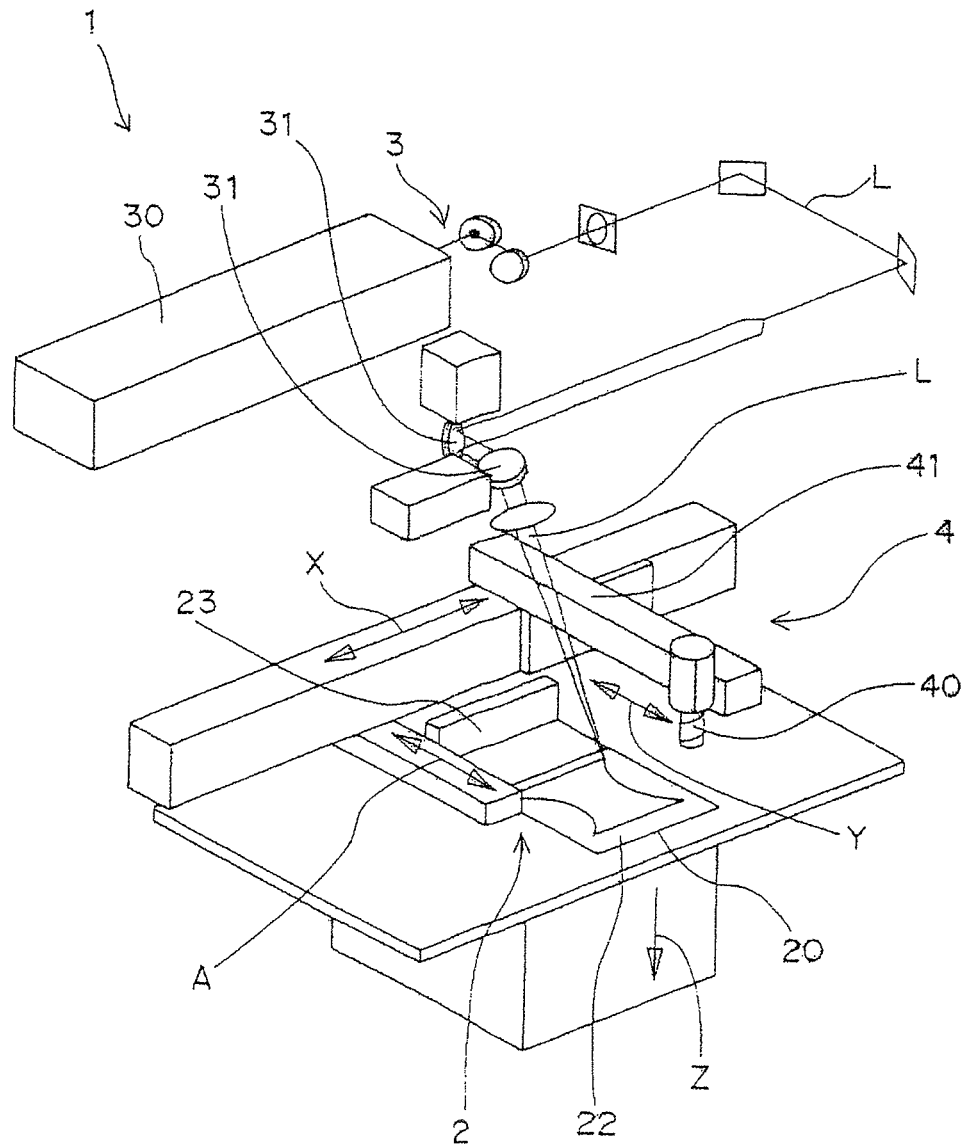
FIG. 5 is a perspective view schematically showing a constitution of a laser-sintering/machining hybrid machine by which a selective laser sintering method is carried out.

First, a selective laser sintering method, on which the manufacturing method of the present invention is based, will be described. For convenience, the selective laser sintering method, which will be described, is one where powder material is supplied from a storage tank therefor, followed by being flattened by means of a squeegee blade to form a powder layer therefrom. Moreover, by way of example, the selective laser sintering method wherein a machining process is additionally carried out with respect to the shaped object (i.e., the process embodiment shown in FIG. 3(a), not FIG. 3 (b)) will be described. FIGS. 1, 4 and 5 show functions and constitutions, which enable execution of the selective laser sintering method, of a laser-sintering/machining hybrid machine. The laser-sintering/milling hybrid machine 1 is mainly provided with a "powder layer forming means 2 for forming a powder layer by providing a powder such as a metal powder or a resin powder in a predetermined thickness"; a "forming table 20 which is capable of vertically elevating/descending by cylinder drive in a forming tank 29 whose outer periphery is surrounded with a wall 27"; a "base plate 21 which is disposed on the forming table 20 and serves as a platform of the shaped object"; a "light-beam irradiation means 3 for irradiating a desired position with an emitted light beam L"; and a "machining means 4 for milling the periphery of the shaped object". As shown in FIG. 1, the powder layer forming means 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on the base plate". As shown in FIG. 4 and FIG. 5, the light-beam irradiation means 3 is mainly composed of a "light beam generator 30 for emitting a light beam L" and a "galvanometer mirror 31 (scan optical system) for scanning the light beam L onto a powder layer 22". Optionally, the light-beam irradiation means 3 is equipped with a beam shape correcting means for adjusting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the periphery of the shaped object" and a "X-Y actuator 41 (41a, 41b) for driving the milling head 40 to move toward the position to be milled (see FIG. 4 and FIG. 5).

Figure 6:
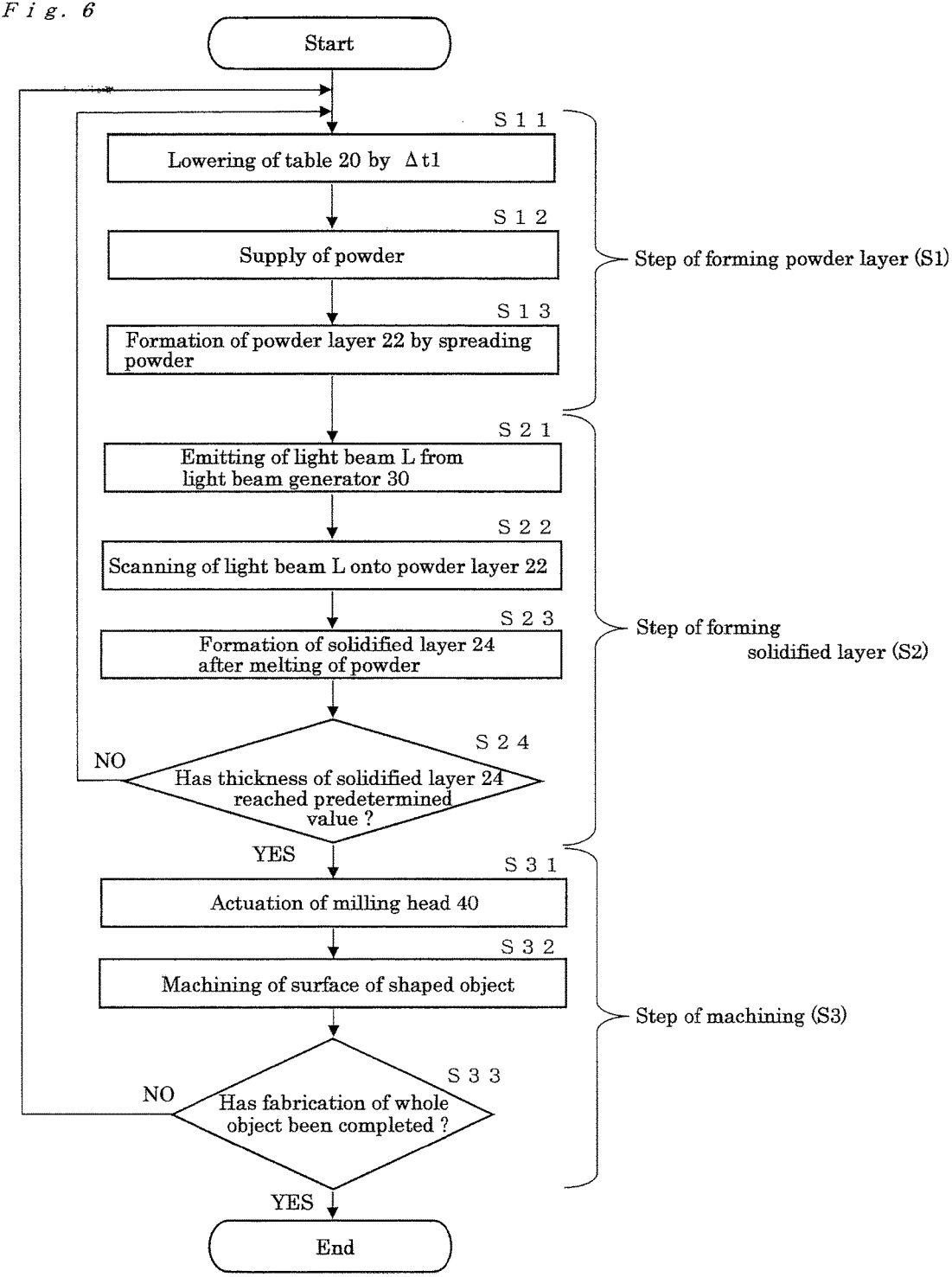
FIG. 6 is a flow chart of operations of a laser-sintering/machining hybrid machine.
Figure 7:
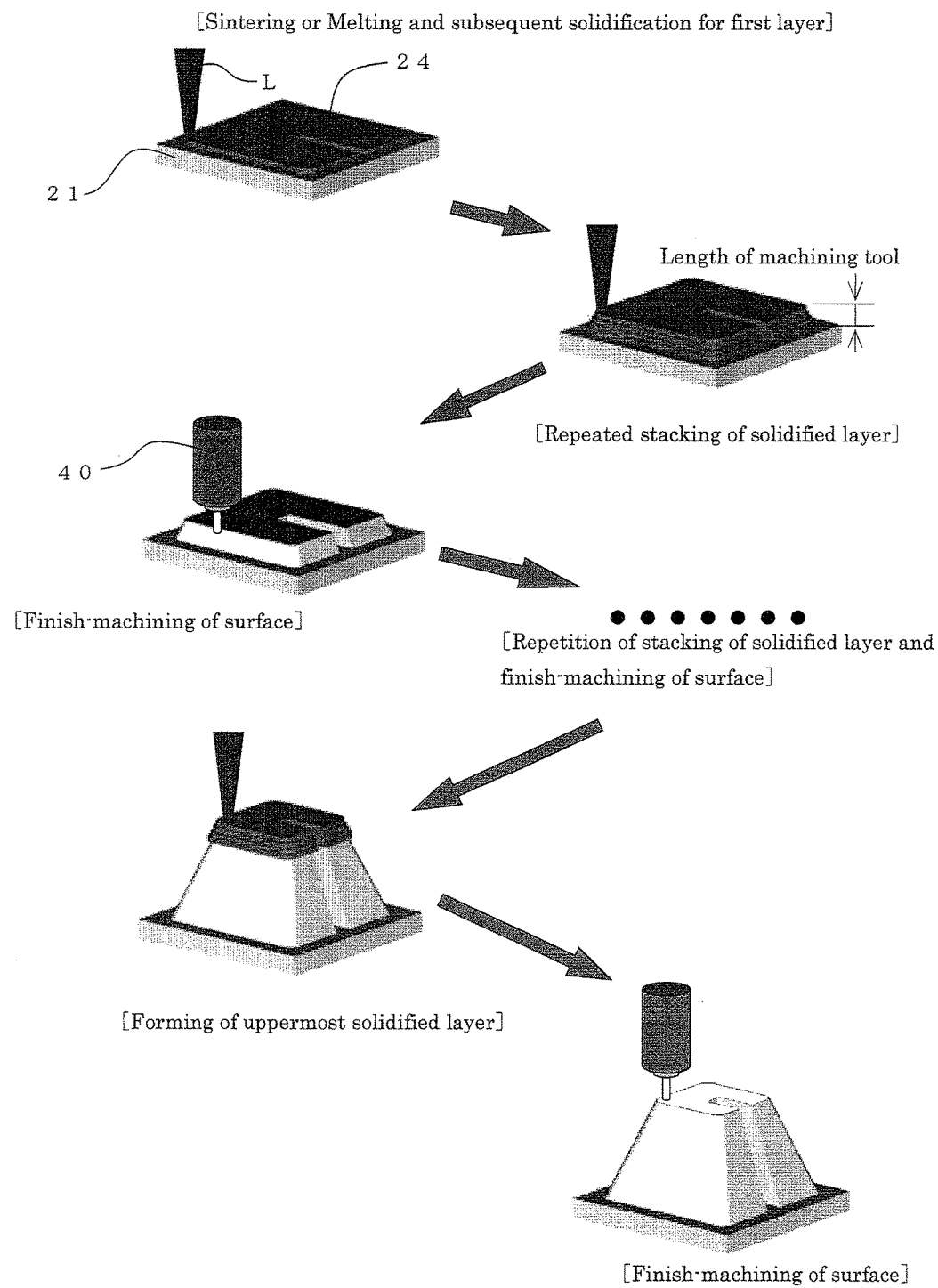
FIG. 7 is a schematic view showing a laser-sintering/machining hybrid process over time.

Operations of the laser-sintering/machining hybrid machine 1 will be described in detail with reference to FIG. 1, FIG. 6 and FIG. 7. FIG. 6 shows a general operation flow of the laser-sintering/machining hybrid machine. FIG. 7 schematically and simply shows a laser-sintering/machining hybrid process.

The operations of the laser-sintering/machining hybrid machine are mainly composed of a powder layer forming step (S1) of forming the powder layer 22; a solidified layer forming step (S2) of irradiating the powder layer 22 with the light beam L to form a solidified layer 24; and a machining step (S3) of milling a surface of the shaped object. In the powder layer forming step (S1), first, the forming table 20 is descended by $\Delta t1$ (S11). Subsequently, a powder table 25 is elevated by $\Delta t1$, and thereafter the squeegee blade 23 is driven to move in the direction of arrow "A" as shown in FIG. 1(a). Whereby, a powder (e.g., an "iron powder having a mean particle diameter of about 5 μm to 100 μm") placed on the powder table 25 is spread to form the powder layer 22 in a predetermined thickness $\Delta t1$ (S13), while being transferred onto the base plate 21 (S12). Following this step, the solidified layer forming step (S2) is performed. In the solidified layer forming step, the light beam L (e.g., carbon dioxide gas laser (500 W), Nd:YAG laser (500 W), fiber laser (500 W) or ultraviolet light) is emitted from the light beam generator 30 (S21) and then the light beam L is scanned onto a desired position of the powder layer 22 by means of the galvanometer mirror 31 (S22). The scanned light beam can cause the powder to be melted and solidified, resulting in a formation of the solidified layer 24 integrated with the base plate 21 (S23). There is not limitation on a transmission of the light beam in air, and thus the light beam may also be transmitted through an optical fiber or the like.

The powder layer forming step (S1) and the solidified layer forming step (S2) are repeatedly performed until the thickness of the stacked layers 24 reaches such a predetermined value that is obtained based on a tool length of the milling head 40 (see FIG. 1(b)). Upon the sintering of the powder or the melting and subsequent solidification of the powder, the newly stacked solidified layer is integrated with the lower solidified layer which has already been formed.

When the thickness of the stacked solidified layers 24 reaches the predetermined thickness, the machining step (S3) is initiated. In the embodiments as shown in FIG. 1 and FIG. 7, the milling head 40 is actuated to initiate the execution of the machining step (S31). For example, in a case where the tool (ball end mill) of the milling head 40 has a diameter of 1 mm and an effective milling length of 3 mm, a milling in a depth of 3 mm can be performed. Therefore, in a case of $\Delta t1$ being 0.05 mm, the milling head 40 is actuated when sixty solidified layers are formed. The milling head 40 is moved in X and Y directions by means of the X-Y actuator 41 (41a, 41b) and the shaped object composed of the stacked solidified layers 24 is subjected to a surface machining (S32). When the entirety of the three-dimensional shaped object has not yet been manufactured, the step returns to the powder layer forming step (S1). Thereafter, the steps S1 through S3 are repeatedly performed to further stack the solidified layers 24, and thereby making it possible to finally manufacture the desired three-dimensional shaped object (see FIG. 7).

An irradiation path of the light beam L in the solidified layer forming step (S2) and a milling path in the machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch in the case of $\Delta t1$ being 0.05 mm) sliced sections of STL data produced from a 3-D CAD model, are used.

[Manufacturing Method of the Present Invention]

Figure 8:
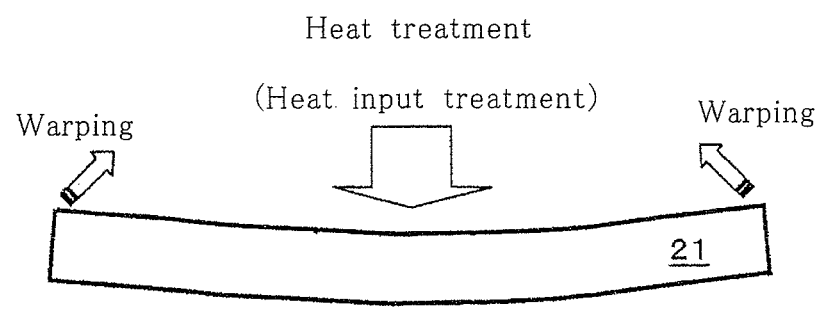
FIGS. 8 (a) and 8 (b) are schematic views showing a general concept of the present invention.
Figure 8:
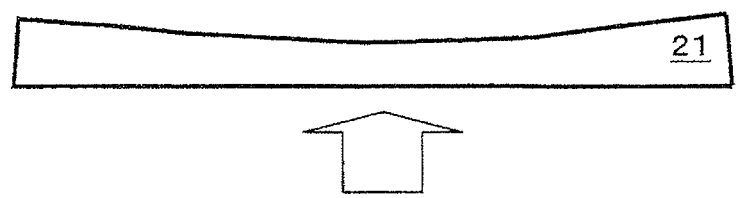

With respect to the selective laser sintering method, the present invention particularly takes account of a stress which may occur in the base plate. More specifically, as shown in FIG. 8, (a) the base plate is subjected to a heat treatment, thereby generating a stress in the base plate, and (b) the base plate thus warped due to such stress is subjected to a flattening process.

In the following description, the present invention will be described by way of an embodiment using a "metal powder" as the powder. The "embodiment using a metal powder" corresponds to an "embodiment using a metal powder layer as a powder layer". In this regard, the metal powder used in the present invention may be a powder containing an iron based powder as a main component, and may be a powder which further contains at least one kind powder selected from the group consisting of a nickel powder, a nickel based alloy powder, a copper powder, a copper based alloy powder and a graphite powder in some cases. Examples of the metal powder include a metal powder in which the proportion of an iron based powder having a mean particle diameter of about 20 μm is 60 to 90% by weight, the proportion of both or either of a nickel powder and a nickel based alloy powder is 5 to 35% by weight, the proportion of both or either of a copper powder and/or a copper based alloy powder is 5 to 15% by weight, and the proportion of a graphite powder is 0.2 to 0.8% by weight.

The heat treatment performed in the present invention may be any one as long as it causes the warp deformation of the base plate. In other words, any heat treatment can be performed in the manufacturing method of the three dimensional shaped object as long as a warping stress occurs in the base plate by the heat treatment. Therefore, examples of the heat treatment include a direct heating of the base plate, and also an indirect heating of the base plate wherein a powder layer and/or a solidified layer formed on the base plate is heated for example.

For performing the heat treatment, the base plate may be irradiated with a light beam used in the selective laser sintering method, for example. Alternatively, the base plate may be irradiated with another light beam, not that of the selective laser sintering method. The term "light beam" as used herein means a directional energy beam like a laser light, for example. In other words, an irradiation source of the light beam for the laser sintering, or another irradiation source which is different therefrom may be used as a heat source for the warp deformation of the base plate. The former has an advantage not only in terms of an improved facility cost since the laser sintering device (i.e., a device for performing the selective laser sintering method) can be utilized even for the heat treatment of the base plate, but also in terms of a wholly facilitated manufacturing process since the same device is used throughout the whole processes. While on the other hand, the latter has an advantage in that a plurality of the operations can be performed in parallel when a plurality of the shaped objects are manufactured. More specifically, the latter makes it possible to execute the "laser sintering" and the "warp deformation of the base plate (and subsequent flattening thereof)" in parallel when a plurality of the shaped objects are manufactured, which leads to a shorten manufacturing time of the shaped objects as a whole.

In a case of the heat treatment of the base plate by the irradiation of the light beam, an adjustment of an output energy of the light beam makes it possible to suitably cause the "warp deformation" attributed to the heat treatment. For example, it is preferred that the irradiation energy density E of the light beam is in the range of about 4 J/mm² to about 15 J/mm². The "warp deformation" can be suitably caused by, in addition to (a) adjusting an output energy of a light beam, (b) adjusting a scanning rate of the light beam, (c) adjusting a scanning pitch of the light beam, and (d) adjusting a condensing diameter of the light beam. The above operations (a) to (d) may be performed alone, or performed in combination. It should be noted that Energy density E=Laser output power [W]/(Scanning rate [mm/s]×Scanning pitch [mm]) wherein the manufacturing condition is as follows: Powder layer thickness: 0.05 mm, Laser: $CO_2$ Laser (Carbon dioxide laser), Spot diameter: 0.5 mm).

In addition to the heating by the light beam irradiation, examples of the heat treatment of the base plate according to the manufacturing method of the present invention include a heating by using an arch discharge, a heating by means of a gas burner, and a heating by an introduction of the base plate into a heating chamber.

Figure 9:
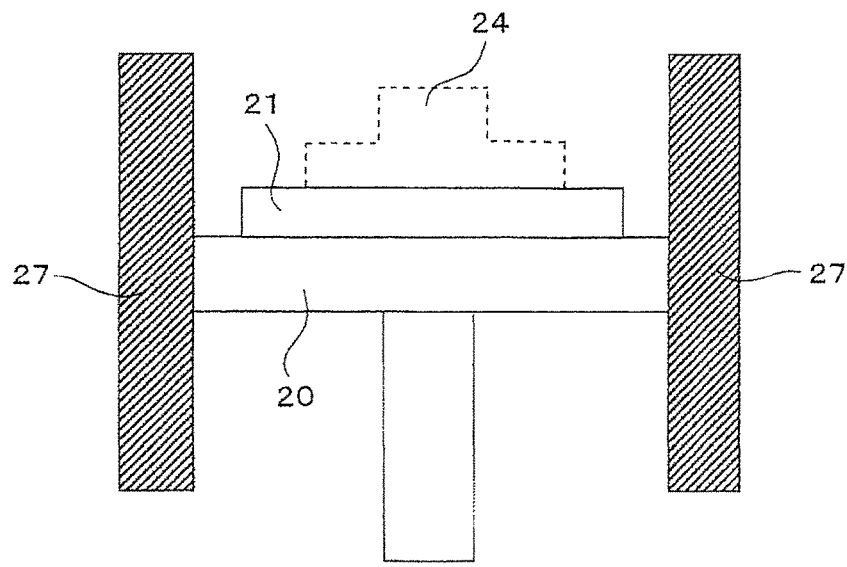
FIG. 9 is a schematic view showing an embodiment of a base plate which can be used in the present invention.
Figure 9:
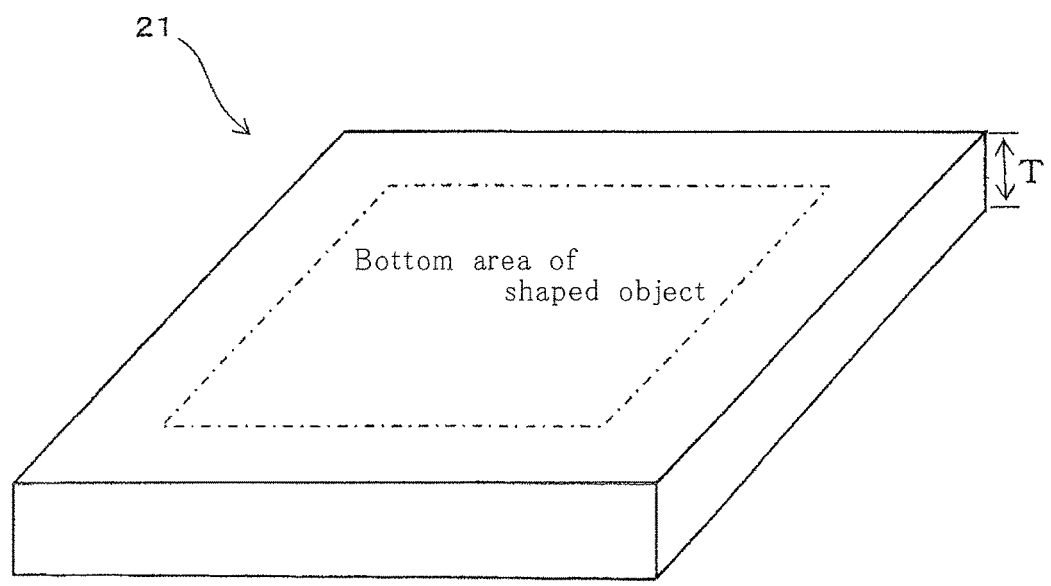

More detailed explanation about the base plate used in the manufacturing method of the present invention is as follows: The form of the base plate is not particularly limited as long as the base plate has a surface serving as a platform for the shaped object (i.e., as long as the base plate has a main surface which serves to support the shaped object). For example, the form of the base plate 21 is not limited to a cuboid form as illustrated in FIG. 9, but may be a disc form, a polygonal column form or the like. The base plate is generally required to have the main surface (i.e., "upper surface" or "lower surface") which has a larger size than that of the bottom surface of the three-dimensional shaped object. For example, the main surface of the base plate 21 has the larger size in 110% to 200% of that of the bottom surface of the shaped object (see FIG. 9). The thickness of the base plate 21 (i.e., "T" in FIG. 9) may be for example in the range of about 10 mm to about 70 mm although it can vary according to the size of the main surface of the base plate, a material of the base plate, a material of the solidified layer or the like.

The material of the base plate is not particularly limited. For example in a case where a metal powder is used as the powder so as to form a sintered layer as the solidified layer (i.e., sintered layer made of an iron-based material), the base plate is preferably made of at least one material selected from the group consisting of a steel, a hardmetal (cemented carbide), a high-speed tool steel, an alloy tool steel, a stainless steel, and a carbon steel for machine construction. According to the present invention, the flattening process of the warped base plate is performed, such warping being attributed to the heat treatment. In this regard, a flat machining means or a machining means may be used for such flattening process. The machining means may be any suitable one as long as it can perform a surface machining treatment. For example, the machining means may be a numerical control (NC: Numerical Control) machine tool or those analogous thereto. Specifically, it is preferred that the machining means is a machining center (MC) whose milling tool (end mill) is automatically exchangeable. As the end mill, for example, a twin bladed ball end mill made of a superhard material is mainly used. A square end mill, a radius end mill or the like may also be used in some cases.

Figure 10:
FIGS. 10(a) through 10(d) are cross sectional views schematically illustrating various embodiment of the flattening of the warped base plate.
Figure 10:
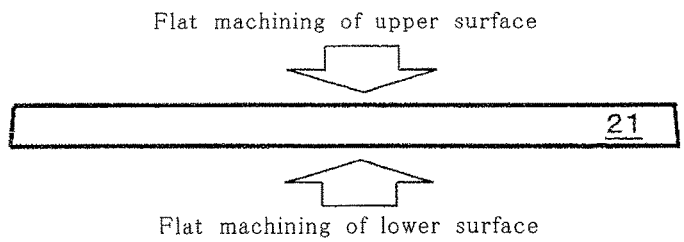
Figure 10:
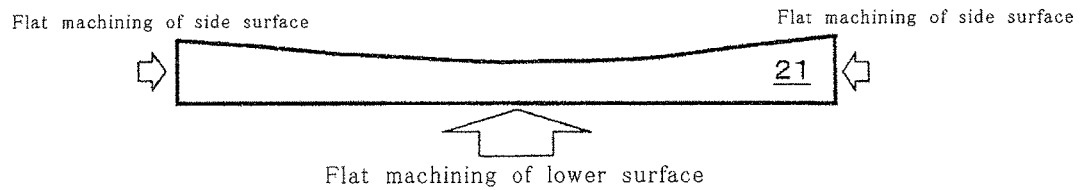
Figure 10:
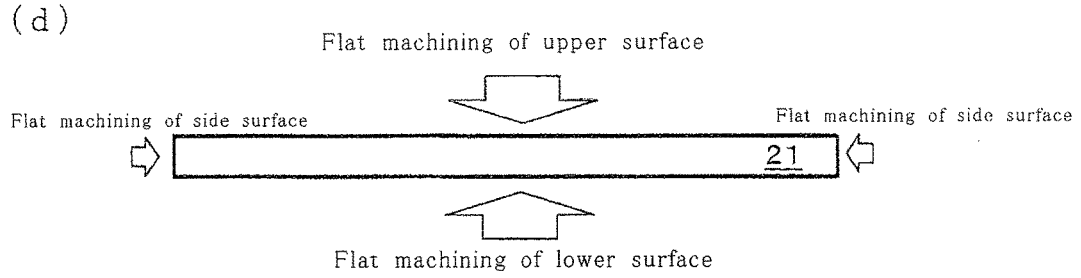

As shown in FIG. 10(a), the flattening process is performed at least with respect to the lower surface of the warped base plate. Examples of the flattening process of at least the lower surface of the warped base plate may include the following flattening:

The flattening with respect to both of the upper and lower surfaces of the warped base plate (see FIG. 10(b)).
The flattening with respect to the lower and side surfaces of the warped base plate (see FIG. 10(c)).
The flattening with respect to all the surfaces (i.e., upper, lower and side surfaces) of the warped base plate (see FIG. 10(d)).

The flattening process according to the present invention enables the warped face of the base plate to be flattened. Thus, the flattening process can form a flat surface in the base plate. In this regard, it is particularly preferred that the flattening process is performed such that the base plate has the flat surface whose surface roughness Rz is preferably 10 μm or less and more preferably 5 μm or less. The term "surface roughness Rz" used herein substantially means a roughness measure which is obtained by adding up "height up to the uppermost mountain peak" and "depth down to the valley portion" from an average line in a roughness profile (i.e., in "cross-sectional profile of the surface of the base plate").

Figure 11:
FIGS. 11(a) through 11(d) are cross sectional views illustrating, over time, a characterized process of a manufacturing method of the present invention.
Figure 11:
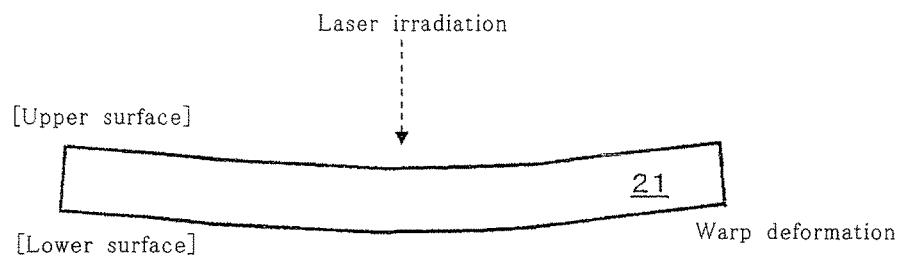
Figure 11:
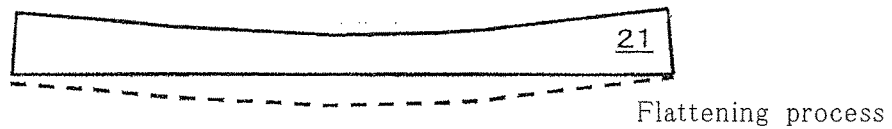
Figure 11:
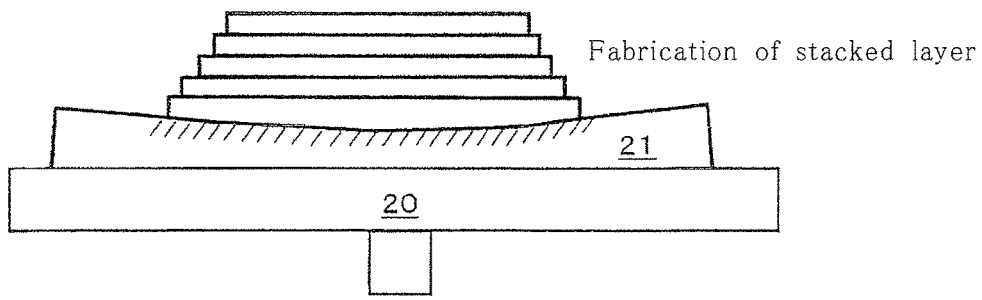

Now, with reference to FIG. 11, the manufacturing method of the present invention over time is described below. It should be noted that the sizes shown in FIG. 11 do not reflect the actual ones.

As illustrated in FIG. 11(a), the base plate 21 which serves as a platform of the shaped object is prepared. Then, the base plate 21 is disposed on a suitable place where the plate is to be subjected to the heat treatment. For example in a case where a laser source for the laser sintering is used as the irradiation source (i.e., in a case where a device for the selective laser sintering method is used), the base plate is disposed on a table for the formation of the layers of the shaped object. The disposed base plate is loosely secured to the table with bolts and the like so as not to inhibit the warp deformation of the base plate. Although the base plate may be tightly secured to the table with the bolts, it is in this case required to loosen the bolts after the heat treatment to allow the base plate to be warped. Subsequent to the disposition of the base plate, it is subjected to the heat treatment to cause the warp deformation of the base plate. For example, as illustrated in FIG. 11(b), the upper surface of the base plate 21 is irradiated with a laser to cause a heat stress to occur, and thereby causing the base plate to be warped. After the warp deformation of the base plate, the warped base plate 21 is subjected to the flattening process. For example, as illustrated in FIG. 11(c), the flat machining process is performed with respect to the lower surface of the base plate 21 by grinding it. After the flattening of the base plate, the base plate is completely secured to the table 20 (for example, the base plate is tightly secured to the table with the bolts) to suitably perform the selective laser sintering method (see FIG. 11(d)). During the laser sintering process performed after the flattening of the warped base plate, the further stress does not excessively accumulate in the base plate. As a result, the further warping of the base plate is effectively prevented, which leads to the prevention of the warping of the obtained three-dimensional shaped object.

The three-dimensional shaped object is obtained such that the shaped object and the base plate are mutually integrated. The three-dimensional shaped object thus manufactured can be used as a metal mold. In this case, the flattened portion can be used as a later-machining reference. The term "later-machining reference" as used herein substantially means an indication used at the later time of another processing. More specifically, considering a case where the three-dimensional shaped object and the base plate integrated therewith are afterward subjected to a machining process in accordance with an intended end-usage, an indicating part therefor can correspond to the later-machining reference. There are various other embodiments with respect to the characterizing feature "the base plate is subjected to the heat treatment, thereby causing the base plate to be warped, and then the lower surface of the warped base plate is subjected to the flattening process". More detailed explanations about that will be described below.

(Heat Input Through Whole Surface of Base Plate)

Figure 12:
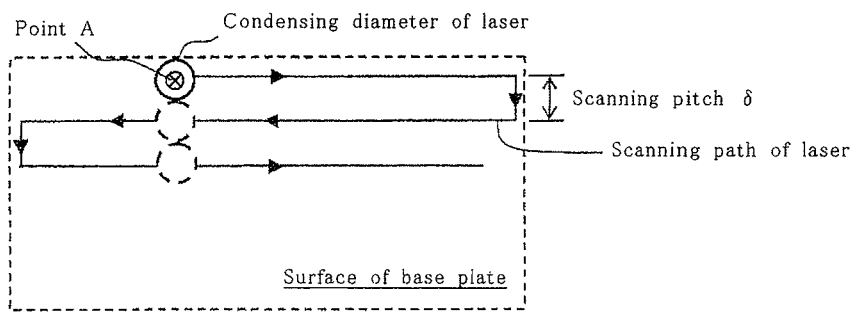
FIG. 12 is a perspective view schematically showing a scanning operation of a light beam upon subjecting the base plate to the heat treatment.

Considering that the warp deformation of the base plate is sufficiently caused, it is preferred that the whole upper surface and/or the whole lower of the base plate are/is heated. For example, in a case where the base plate is heated by the irradiation of the light beam, the whole upper surface and/or the whole lower of the base plate can be heated by scanning the light beam as illustrated in FIG. 12.

Upon the laser sintering, a stress tends to occur and accumulate at a boundary area between the base plate and the shaped object (more detailed explanation about this will be described with reference to FIG. 14). It is thus preferred that a contact area between the base plate and the shaped object is subjected to the heat treatment, such contact area being provided in the upper surface of the base plate.

(Heat Treatment of Powder Layer and/or Solidified Layer)

Figure 13:
FIG. 13 is a perspective view schematically showing an example of a heat treatment of a powder layer and/or a solidified layer.
Figure 13:
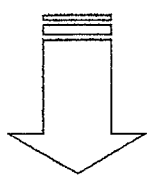
Figure 13:
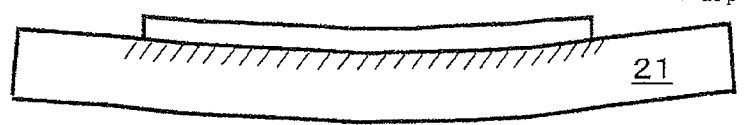

The heat treatment according to the present invention may be performed upon the manufacturing of the three-dimensional shaped object. More specifically, "one or more layers of the powder layer and/or solidified layer formed on the base plate" may be subjected to the heat treatment to cause the warping of the base plate. For example, as illustrated in FIG. 13, a first powder layer formed on the base plate may be irradiated with the light beam, and thereby causing a warping stress to occur in the base plate (i.e., the warp deformation of the base plate is caused) upon the formation of the solidified layer. As for the second layer, the new powder layer formed on the first solidified layer may be irradiated with the light beam to cause the further warping stress to occur in the base plate. The heating of the subsequent layers (i.e., the layers of more than the second layers) can be the same as that of the second layer.

The heat treatment of the powder layer and/or the solidified layer is described below in detail. The residual stress, which may occur in the base plate, tends to accumulate mainly at a boundary portion between the base plate and the solidified layer (i.e., sintered layer) as well as the uppermost surface of the stacked layers (i.e., the vicinity of the last layer which has been lastly molten and subsequently solidified). This means that the residual stress tends to hardly accumulate at a middle portion of the stacked layers. See FIG. 14. This is mainly due to a stress relaxation, while not wishing to be bound by any theory. Specifically, a shrinking stress can occur and accumulate at $N^{th}$ layer corresponding to the middle portion of the stacked layers when the $N^{th}$ layer is subjected to the melting and the subsequent solidification (i.e., the sintering). However, during the repetition of the melting and the subsequent solidification (i.e., sintering), that is, during the repeated formations of N+1 layer, N+2 layer . . . , the $N^{th}$ layer can be affected by the heat from the subsequently repeated formation so that the accumulated stress in the $N^{th}$ layer is relived.

Figure 14:
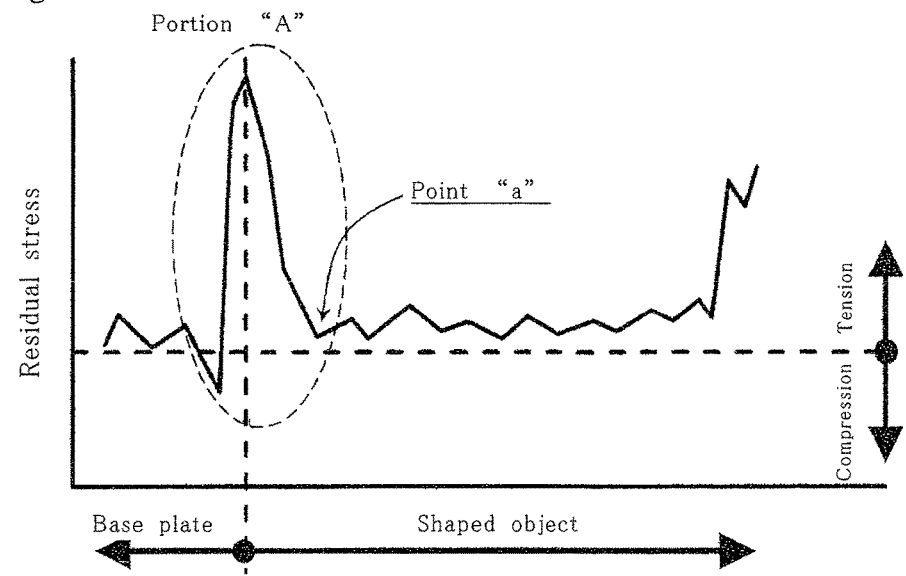
FIG. 14 is a graph showing a residual stress which may accumulate in the base plate and/or the shaped object.

With respect to the result shown in FIG. 14, it should be particularly noted that the heat stress is unlikely to be relived at the boundary portion between the shaped object and the base plate, and thereby the stress tends to accumulate at such boundary portion. This can be seen from the fact that the residual stress is larger at portion "A" in the graph of FIG. 14. When such result of FIG. 14 is suitably applied to the manufacturing method of the present invention, the base plate may be subjected to the flattening process after the formation process of the shaped object nearly reaches a point "a" at which the residual stress has decreased. This means that the stacking process of the solidified layer is repeated until the stacked layers have a height corresponding to the point "a" or higher, and thereafter the flattening process of the base plate is performed. Accordingly, after a point in time of the flattening, the further stress is unlikely to accumulate in the base plate during the subsequent forming process of the solidified layer, which leads to the prevention of the warping of the finally obtained three-dimensional shaped object (more specifically, the prevention of the warping of the shaped objected integrated with the base plate). In other words, the warp deformation upon the stacking process of the layers can be effectively prevented when using the flattened plate as the base plate in which the stress at the boundary (i.e., the boundary portion between the shaped object and the base plate) had been already caused, and thereafter the plate has been subjected to the flattening process. In view of the result of FIG. 15 obtained by a keen study of the inventors of the present invention (i.e., in view of a correlation between the warping and the number of stacked layers), it has been found that the degree of the warping shows little change after the stacking of about 50 to 100 solidified layers. Therefore, the residual stress is unlikely to further accumulate during the laser sintering process after the stacking of about 50 to 100 solidified layers is formed, which leads to the effective prevention of the warping of the finally obtained three-dimensional shaped object.

Figure 15:
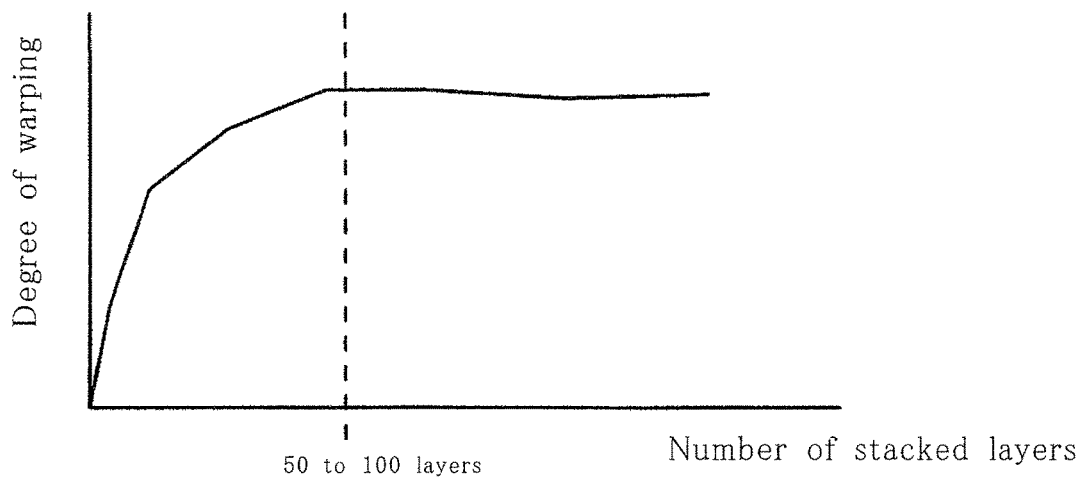
FIG. 15 is a graph showing a correlation between the layer number of stacked layers and the warping of the base plate.

●Graph of FIG. 15

The graph of FIG. 15 is based on the following conditions:
Powder: Iron-based mixed powder having an average particle diameter of 50 μm
Layer thickness: About 0.05 mm
Irradiation energy density E of light beam: About 5 J/mm$^2$ to about 15 J/mm$^2$
Material of base plate: Carbon steel (S50C)
Size of base plate: 125 mm (W) ×125 mm (L) ×8 mm (T)

(Heat Treatment According to Shaped Object)

The heat treatment of the base plate may be suitably performed in accordance with the three-dimensional shaped object to be manufactured. More specifically, a heat input area or a heat input amount regarding the base plate may be determined according to at least one of the following parameters, for example:
Weight of the three-dimensional shaped object to be manufactured;
Volume of the three-dimensional shaped object to be manufactured;
Position of the three-dimensional shaped object to be manufactured;
Shape of a contact region between the three-dimensional shaped object to be manufactured and the base plate; and
Area of a contact region between the three-dimensional shaped object to be manufactured and the base plate.

Figure 16:
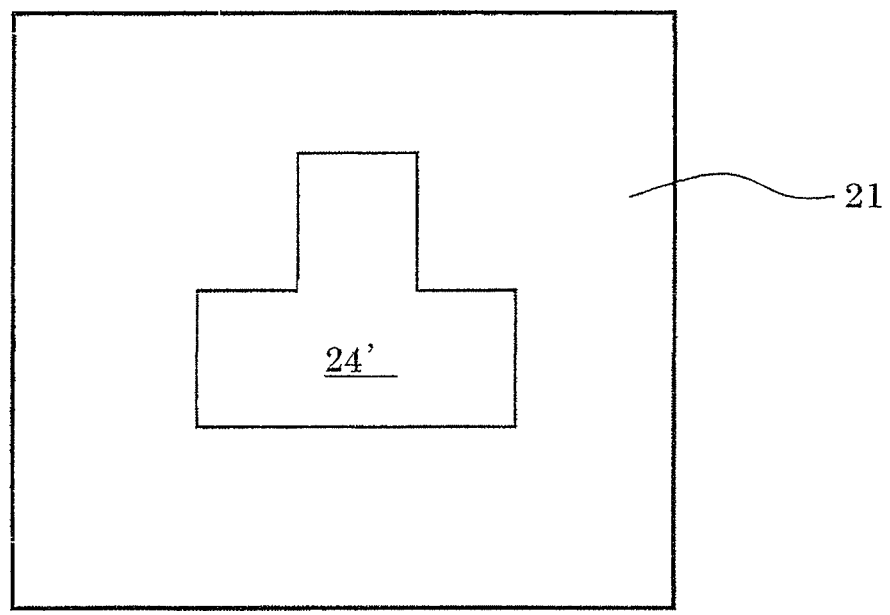
FIG. 16 schematically illustrates a contour shape and a position of a bottom surface of the shaped object in a surface region of the base plate.

The term "heat input area" as used herein corresponds to the "heating area of the base plate" in a case where the base plate is heated prior to the manufacturing of the three-dimensional shaped object, whereas it corresponds to the "heating area of the one or more layers of the powder layer and/or solidified layer formed on the base plate" in a case where the base plate is heated upon the manufacturing of the three-dimensional shaped object. As illustrated in FIG. 16, examples of the "heat treatment according to the shaped object" may include the heating of only the limited area corresponding to the bottom surface of the shaped object.

[Three-Dimensional Shaped Object of the Present Invention]

The three-dimensional shaped object of the present invention which can be obtained according to the above manufacturing method will be now described. The three-dimensional shaped object of the present invention has the base plate wherein the bottom surface of the three-dimensional shaped object and the base plate are jointed with each other. In this regard, the three-dimensional shaped object of the present invention is configured to have the base plate whose bottom surface is a flattened surface due to the above manufacturing method. It is preferred that a surface roughness Rz of the flattened surface may be preferably 10 µm or less (Rz=0 to 10 µm), and more preferably 5 µm or less (Rz=0 to 5 µm). Since the other configurations of the three-dimensional shaped object is described in the above [Manufacturing Method of the Present Invention], the description thereof is omitted here in order to avoid the duplicated explanation.

Although a few embodiments of the present invention have been hereinbefore described, the present invention is not limited to these embodiments. It will be readily appreciated by those skilled in the art that various modifications are possible without departing from the scope of the present invention. As an additional remark, the invention of JP 2007-270227 will be briefly explained, while the technical idea thereof being essentially different from that of the present invention. Japanese Unexamined Publication No. 2007-270227 discloses a "method for manufacturing an optically shaped article". In the manufacturing method disclosed therein, the residual stress is eliminated by the heating treatment of the sintered layer. Specifically, the disclosed method of JP 2007-270227 is characterized in that the elimination of the residual stress is performed particularly by a heat annealing treatment. Therefore, JP 2007-270227 neither discloses nor suggests the idea of the present invention wherein the base plate with the stress remaining therein is positively used.

It should be noted that the present invention as described above includes the following aspects:

The First Aspect: A method for manufacturing a three-dimensional shaped object, comprising the steps of:

(i) forming a solidified layer by irradiating a predetermined portion of a powder layer on a base plate with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed;

wherein, prior to or during the manufacturing of the three-dimensional shaped object, (a) the base plate is subjected to a heat treatment, and thereby causing the base plate to be warped, and then (b) at least a lower surface of the base plate thus warped is subjected to a flat machining process.

The Second Aspect: The method according to the first aspect, wherein an upper surface of the base plate is subjected to the heat treatment in the (a).

The Third Aspect: The method according to the second aspect, wherein the base plate is subjected to the heat treatment such that the upper surface of the base plate is wholly heated.

The Fourth Aspect: The method according to the first aspect, wherein, in the (a), one or more layers of the powder layer and/or solidified layer formed on the base plate is subjected to the heat treatment to cause the warping of the base plate.

The Fifth Aspect: The method according to any one of the first to fourth aspects, wherein a heating area of the base plate or a heating area of the one or more layers of the powder layer and/or solidified layer formed on the base plate is determined according to the three-dimensional shaped object to be manufactured; and the determined heating area is subjected to the heat treatment in the (a).

The Sixth Aspect: The method according to the fifth aspect, wherein the flat machining process of the (b) is performed after the formation of 50 to 100 layers of the solidified layers on the base plate is completed.

The Seventh Aspect: The method according to anyone of the first to sixth aspects, wherein an irradiation source for the light beam of the steps (i) and (ii) is used as a heat source for the heat treatment of the (a).

The Eighth Aspect: A three-dimensional shaped object obtained by the method according to any one of the first to seventh aspects, wherein a bottom surface of the three-dimensional shaped object is provided with a base plate, the bottom surface of the shaped object and the base plate being jointed with each other; and a lower surface of the base plate is a flat machined surface.

INDUSTRIAL APPLICABILITY

The method for manufacturing a three-dimensional shaped object according to present invention can produce various kinds of objects. For example in a case where the powder layer is a metal powder layer (i.e., inorganic powder layer) and thus the solidified layer corresponds to a sintered layer, the produced three-dimensional shaped object can be used as a metal mold for a plastic injection molding, a press molding, a die casting, a casting or a forging. While on the other hand in a case where the powder layer is a resin powder layer (i.e., organic powder layer) and thus the solidified layer corresponds to a cured layer, the produced three-dimensional shaped object can be used as a resin molded article.

CROSS REFERENCE TO RELATED PATENT APPLICATION

The present application claims the right of priority of Japanese Patent Application No. 2010-32684 (filed on Feb. 17, 2010, the title of the invention: "METHOD FOR MANUFACTURING THREE-DIMENSIONAL SHAPED OBJECT AND THREE-DIMENSIONAL SHAPED OBJECT"), the disclosure of which is incorporated herein by reference.

The invention claimed is:

1. A method for manufacturing a three-dimensional shaped object, comprising:

forming a solidified layer by irradiating a predetermined portion of a powder layer on a base plate with a light beam, thereby allowing sintering of the powder of the predetermined portion or melting and subsequent solidification thereof; and forming another solidified layer by newly forming a powder layer on the resulting solidified layer, and then irradiating another predetermined portion of the new powder layer with the light beam, the formation of the solidified layer and the another solidified layer being repeatedly performed;

wherein, upon the manufacturing of the three-dimensional shaped object, the base plate is subjected to a heat treatment, thereby causing the base plate to be warped, and at least a lower surface of the warped base plate is subjected to a flattening process comprising machining a lower surface of the warped base plate, wherein, in the heat treatment of the base plate, one or more layers of at least one of the powder layer and solidified layer formed on the base plate is subjected to the heat treatment to cause the warping of the base plate, wherein an irradiation source for the light beam is used as a heat source for the heat treatment, and wherein the flattening process is performed after 50 to 100 layers of the solidified layers are formed on the base plate so as to decrease a residual stress.

2. The method according to claim 1, wherein an upper surface of the base plate is subjected to the heat treatment.

3. The method according to claim 2, wherein the whole upper surface of the base plate is heated.

4. The method according to claim 1, wherein a heating area of the base plate or a heating area of the one or more layers of at least one of the powder layer and solidified layer formed on the base plate is determined in accordance with the three-dimensional shaped object to be manufactured; and the determined heating area is subjected to the heat treatment.

5. The method according to claim 1, wherein a plate having a deformed portion as a result of the warping caused by the heat treatment is provided as the base plate that is subjected to the flattening process.

6. The method according to claim 1, wherein a plate having the residual stress as a result of the heat treatment remaining therein is provided as the base plate that is subjected to the flattening process.

* * * * *